(12) United States Patent
Tochio

(10) Patent No.: US 9,048,966 B2
(45) Date of Patent: Jun. 2, 2015

(54) OPTICAL TRANSMISSION APPARATUS

(75) Inventor: Yuji Tochio, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 618 days.

(21) Appl. No.: 13/311,944

(22) Filed: Dec. 6, 2011

(65) Prior Publication Data

US 2012/0183291 A1 Jul. 19, 2012

(30) Foreign Application Priority Data

Jan. 18, 2011 (JP) ................................. 2011-007904

(51) Int. Cl.
*H04J 14/02* (2006.01)
*H04J 14/04* (2006.01)
*H04J 3/16* (2006.01)

(52) U.S. Cl.
CPC ................... *H04J 3/1694* (2013.01)

(58) Field of Classification Search
CPC ... H04J 14/0278; H04J 14/02; H04J 14/0202; H04J 14/0201; H04J 3/16141; H04J 3/1617; H04J 3/1652; H04J 2203/0089; H04L 49/602; H04L 49/3081; H04L 2012/5652; H04Q 11/0001
USPC ............................................. 398/54, 43, 183
See application file for complete search history.

(56) References Cited

U.S. PATENT DOCUMENTS

| | | | |
|---|---|---|---|
| 5,495,479 A | 2/1996 | Galaand et al. | |
| 6,122,249 A * | 9/2000 | Mochizuki et al. | 370/220 |
| 6,339,488 B1 | 1/2002 | Beshai et al. | |
| 6,614,760 B1 * | 9/2003 | Suzuki et al. | 370/244 |
| 7,269,129 B2 * | 9/2007 | Yasuo et al. | 370/217 |
| 7,394,772 B2 | 7/2008 | Shin et al. | |
| 7,831,149 B2 * | 11/2010 | Sakamoto | 398/83 |
| 7,957,266 B2 | 6/2011 | Kodialam et al. | |
| 7,978,594 B2 | 7/2011 | Kodialam | |
| 8,027,245 B2 | 9/2011 | Kodialam | |
| 8,849,116 B2 * | 9/2014 | Bellato et al. | 398/52 |
| 2002/0064166 A1 * | 5/2002 | Suetsugu et al. | 370/403 |
| 2002/0065073 A1 * | 5/2002 | Natani et al. | 455/422 |
| 2002/0093971 A1 * | 7/2002 | Yasuo et al. | 370/403 |
| 2002/0099854 A1 * | 7/2002 | Jorgensen | 709/249 |
| 2003/0120799 A1 * | 6/2003 | Lahav et al. | 709/236 |
| 2003/0123493 A1 | 7/2003 | Takahashi | |
| 2003/0179712 A1 * | 9/2003 | Kobayashi et al. | 370/249 |
| 2004/0151172 A1 * | 8/2004 | Notani et al. | 370/380 |
| 2005/0025195 A1 * | 2/2005 | Barrett et al. | 370/532 |
| 2005/0185654 A1 * | 8/2005 | Zadikian et al. | 370/395.21 |
| 2005/0265255 A1 | 12/2005 | Kodialam et al. | |
| 2006/0133366 A1 * | 6/2006 | Ho et al. | 370/389 |
| 2008/0095537 A1 * | 4/2008 | Sakamoto | 398/83 |
| 2009/0232133 A1 * | 9/2009 | Yu et al. | 370/389 |
| 2010/0158519 A1 | 6/2010 | Dong et al. | |
| 2013/0028602 A1 | 1/2013 | Fu et al. | |
| 2013/0107894 A1 * | 5/2013 | Lanzone et al. | 370/474 |

FOREIGN PATENT DOCUMENTS

| | | |
|---|---|---|
| JP | 7-66834 | 3/1995 |
| JP | 2737828 B | 4/1998 |
| JP | 2000-92000 A | 3/2000 |
| JP | 2003-23447 A | 1/2003 |
| JP | 2003-169083 A | 6/2003 |
| JP | 2003-188919 A | 7/2003 |
| JP | 2005-341589 A | 12/2005 |
| JP | 2007-166433 A | 6/2007 |
| JP | 2009-260705 A | 11/2009 |
| JP | 2009-296371 | 12/2009 |
| JP | 2010-541509 | 12/2010 |
| JP | 2013-524559 | 6/2013 |
| WO | 2010/103018 A1 | 9/2010 |
| WO | WO2012000565 A1 * | 1/2012 ................ H04J 3/16 |

OTHER PUBLICATIONS

"ITU-T Recommendation G.709 (http://itu.int/rec/T-REC-G.709)", Dec. 2009.
"ITU-T Recommendation G.798 14.3.7", Oct. 2010.
JPOA—Japanese Office Action dated Jun. 3, 2014 issued for corresponding Japanese Patent Application No. 2011-007904 with partial English translation.

* cited by examiner

*Primary Examiner* — Wutchung Chu
(74) *Attorney, Agent, or Firm* — Fujitsu Patent Center

(57) ABSTRACT

An HO ODU signal input to an optical transmission apparatus is disassembled into LO ODUs. LO ODUs specified to form an aggregated ODU are disassembled not into individual LO ODUs but into a unit of an LO ODU group that forms an aggregated ODU. Clock extraction and an alarm process are performed not for the individual LO ODUs but for each aggregated ODU. This eliminates the need for a hardware configuration for performing the clock extraction and the alarm process in units of LO ODUs, leading to saving of hardware resources.

6 Claims, 17 Drawing Sheets

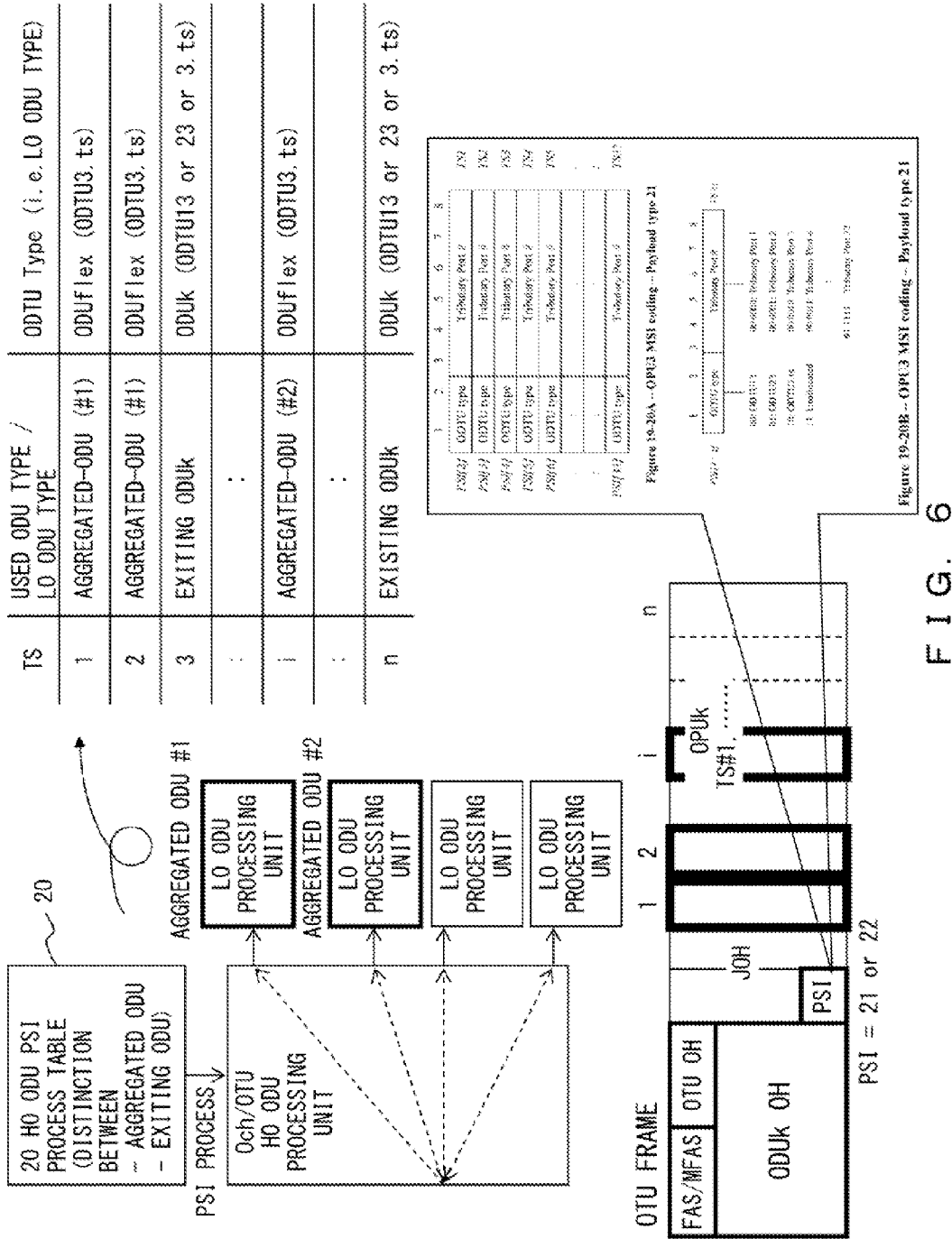
F I G. 6

OPTICAL TRANSMISSION APPARATUS

CROSS-REFERENCE TO RELATED APPLICATION

This application is based upon and claims the benefit of priority of the prior Japanese Patent Application No. 2011-007904, filed on Jan. 18, 2011, the entire contents of which are incorporated herein by reference.

FIELD

The embodiment discussed herein is related to an optical transmission apparatus.

BACKGROUND

With a recent increase in network traffic, a network that implements a connection between points with a large capacity is needed. Especially, when an enterprise network is configured, a one-to-multi network connection (multipoint connection) such as a connection between a data center and a plurality of points is important.

FIGS. 1A and 1B are explanatory views of a conventional technique.

As a technique for connecting between points with a large capacity, a connection using an ODU (Optical channel Data Unit) defined by ITU-T Recommendation G.709 is effective. However, when a one-to-multi network connection (multipoint connection) for individually deciding bands for points is made, the connection needs to be made by setting a plurality of point-to-point (p2p) ODUs as illustrated in FIG. 1A. In this case, it is needed not only to individually manage the ODUs but to uniquely set routes. Accordingly, there is a possibility that paths of a plurality of routes are set for a partial area within a network.

A case where a network apparatus X and network apparatuses Y and Z are respectively connected as illustrated in FIG. 1A is considered as an example. Assume that there are nodes A to E as relay nodes. If a service operator requests setting of a path (2) after optimally setting a path (1), a network operator sometimes provides a route A-B-D-C due to an insufficient bandwidth between the nodes A and C. However, when communications using the routes (1) and (2) are set, both of the routes (1) and (2) can be sometimes set by using a route A-B-D-C-E. As a result, the number of links (also the number of nodes depending on a case) to be managed as a whole in the case of FIG. 1B becomes smaller. Therefore, it is more efficient in operations for both of the routes to set a route by aggregating routes as many as possible when routes are set from one point to multi points. Here, a path is a communication route used for a communication between points, and includes a plurality of relay nodes. In contrast, a link is a physical connection route between nodes.

Namely, in the case of FIG. 1A, the route (1) between X and Y is optimally formed, and the route (2) between X and Z is formed next. However, since the bandwidth between A and C is insufficient on the route of (2), the route A-B-D-C is formed via the nodes B and D. Here, in FIG. 1B, the nodes A to E are collectively set on the routes (1) and (2). In FIG. 1A, the number of links is 5 (A to E, A to B, B to D, D to C and C to E) and the number of ports is 10. In the meantime, in FIG. 1B, the number of links is 4 (A to B, B to D, D to C and C to E) and the number of ports is 8. Accordingly, it is proved that the number of inks and the number of ports, which are to be managed, are smaller in the case of FIG. 1B.

FIG. 2 is a block diagram illustrating a configuration of a conventional relay node.

An input optical signal is input to an Och/OTU HO ODU (Optical ch/Optical channel Transport Unit/High Order channel Optical Data Unit) processing unit 10. The Och/OTU HO ODU processing unit 10 processes an overhead of an outer frame (HO ODU) in a layered frame that configures the optical signal, and extracts contents of a payload. LO ODUs (Low Order Optical channel Data Units) extracted from the payload of the HO ODU are individually input to prepared LO ODU processing units 11-1 to 11-3. After storing the received LD ODU in a buffer and extracting a clock, the LO ODU processing units 11-1 to 11-3 input the LO ODU and the clock to SW internal processing units 12-1, 12-2. The SW (SWitch) internal processing units 12-1, 12-2 store the LO ODU in a buffer, extract an OPU (Optical channel Payload Unit) from a payload of the LO ODU, generate an internal frame that is a unit of switching used within a switch (SW) 13, and output the generated frame to the switch 13. This OPU extraction process corresponds to a TS (Tributary Slot) process.

The internal frame for which a switching process has been executed by the switch 13 is input to SW internal processing units 15-1, 15-2, which reconfigure an LO OPU from the internal frame. Then, LO ODU processing units 16-1, 162 insert an overhead and the like in the reconfigured LO OPU, and input the LO OPU to HO ODU processing units 17-1, 17-2. The HO ODU processing units 17-1, 17-2 store the received LO ODU in a payload of HO ODU, generate an overhead, and assemble and transmit the HO ODU. A system clock 14 supplies an operation clock to the SW internal processing units 12-1, 12-2, 15-1, 15-2 and the switch 13.

Examples of conventional techniques include a technique for forming a dedicated channel between electronic edge switches of edge nodes, a technique for setting an optimum end-to-end path, a technique for setting an efficient path independently of a traffic pattern, and a technique for extracting information of a route having a minimum cost in advance.

PATENT DOCUMENTS

[Patent Document 1] Japanese Laid-open Patent Publication No. 2000-92000
[Patent Document 2] Japanese Laid-open Patent Publication No. 7-66834
[Patent Document 3] Japanese Laid-open Patent Publication No. 2005-341589
[Patent Document 4] Japanese Laid-open Patent Publication No. 2009-260705

NON-PATENT DOCUMENTS

[Non-patent Document 1] ITU-T Recommendation G.709 (http://itu.int/rec/T-REC-G.709)
[Non-patent Document 2] ITU-T Recommendation G.798 14.3.7

FIG. 3 is an explanatory view of a conventional problem.

Incidentally, even if the number (total sum) of relay nodes/ports to be provided is reduced by providing a path with an aggregation of routes, a path is provided in units of LO ODUs (whereas a link is provided in units of HO OTUs/ODUs (High Order Optical channel Transport Units/Optical channel Data Units). Accordingly, each node that a path goes through is configured via a switch function (SW) by extracting (part of) LO ODU as illustrated in FIG. 3, and a clock process and an alarm (ODU AIS) process are needed for each LO ODU (see Non-patent Document 2). Accordingly, reductions in hardware processes for a section where paths are aggregated are further desired.

SUMMARY

An optical transmission apparatus in one aspect of this embodiment is an optical transmission apparatus in a network for making a one-to-multi communication by establishing paths from one point to multi points. The optical transmission apparatus includes: a reception side high-order layer data unit processing unit configured to demultiplex, as one aggregation, a plurality of data units of a low-order layer transmitted by using a path sharing a section from other data units of a low-order layer when data is transmitted in the section shared by the paths within the network in a process for extracting data units of a low-order layer from a data unit of a high-order layer of an input optical signal; a reception side low-order layer data unit processing unit configured to perform clock extraction in a unit of the plurality of data units of the low-order layer as one aggregation for the plurality of data units of the low-order layer as one aggregation, and to execute an alarm process in the unit of the plurality of data units of the low-order layer as one aggregation; a switching unit configured to perform switching by disassembling an output of the reception side low-order layer data unit processing unit into internal frames for switching, and to generate data units of a low-order layer from the internal frames for switching after the switching is performed; a transmission side low-order layer data unit processing unit configured to insert alarm information, obtained by the reception side low-order layer data unit processing unit, in the plurality of data units of the low-order layer as one aggregation transmitted by using the path sharing the section among the data units of the low-order layer formed after the switching is performed; and a transmission side high-order layer data unit processing unit configured to assemble the data units of the low-order layer from the transmission side low-order layer data unit processing unit into a data unit of a high-order layer, and to transmit the assembled data unit.

According to the embodiment described below, an optical transmission apparatus that can reduce hardware resources needed for processes is provided.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 illustrates an example of a configuration of an HO ODU PSI process table;

DESCRIPTION OF EMBODIMENTS

The embodiment described below is applied to a network for implementing a connection between multi points with a line defined by OTN (Optical Transport network) or the like in a core network.

The embodiment described below refers to an optical transmission apparatus for setting a plurality of ODU paths from one point to a plurality of points, and for providing or relaying an aggregated ODU path when aggregating and providing ODU paths (that is, as a common link) in a partial section. At that time, one ODU segment (as a unit of forming one ODU path and of collectively performing clock generation and an alarm process of an LO ODU, or referred to as an aggregated ODU) is formed, and a function to maintain an alarm transfer function for each ODU is provided, thereby reducing hardware processes such as a clock process and the like in the section.

Figure 4:
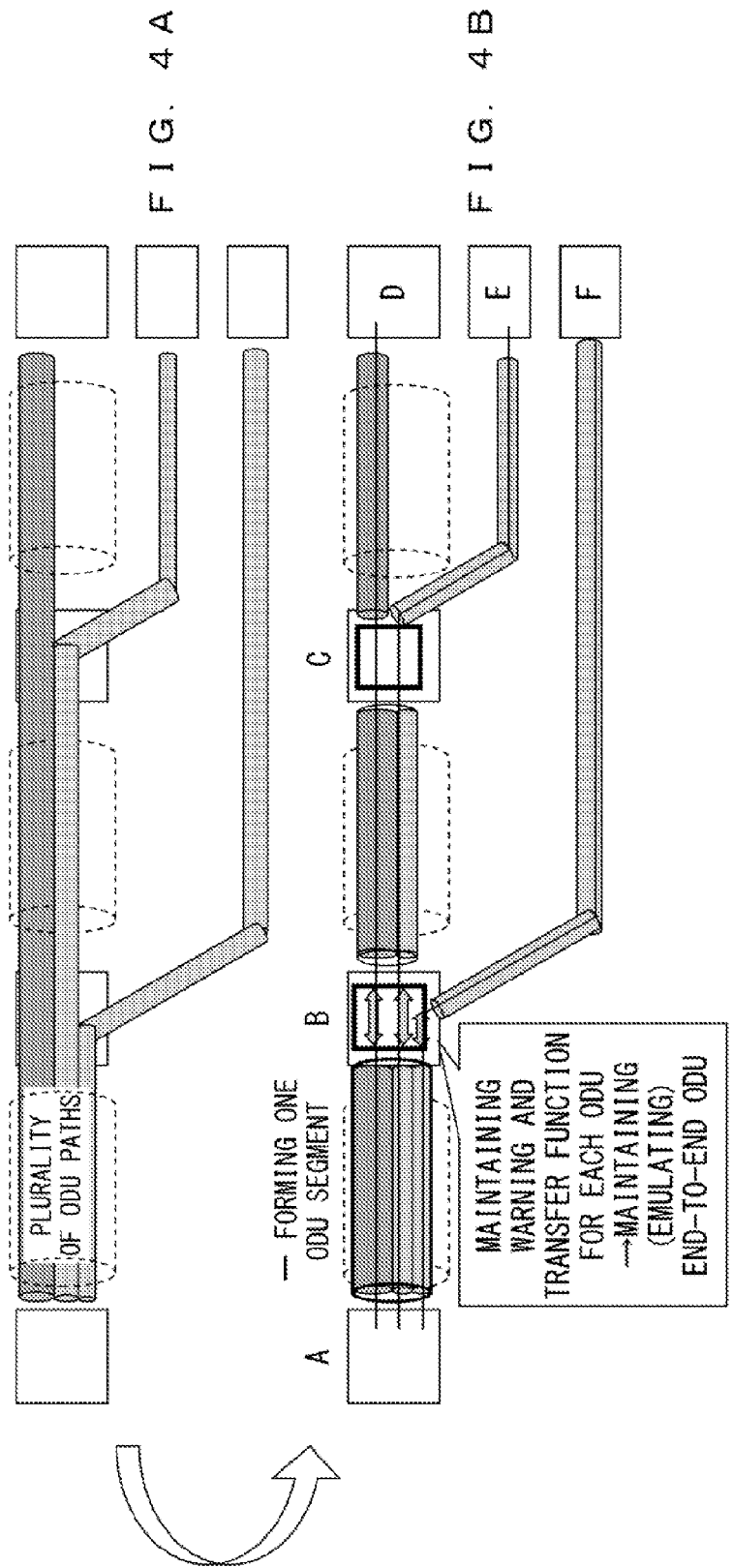
FIGS. 4A and 4B are explanatory views of an outline of this embodiment.

FIGS. 4A and 4B are explanatory views of an outline of this embodiment.

OTN is different from SDH (TDM line) in a point that OTN implements flexible multiplexing based on ODU, whereas SDH implements fixed multiplexing such as 4:1, 16:1 or the like.

As illustrated in FIG. 4A, a plurality of ODUs are collected into one aggregated ODU in a common portion of a link that a plurality of ODU paths go through when the plurality of ODU paths are set, and an alarm transfer function is maintained for each aggregated ODU. Namely, a relay device that processes an aggregated ODU inherits alarm information in units of ODUs transferred by each aggregated ODU, and generates a clock in units of aggregated ODUs.

Figure 5:
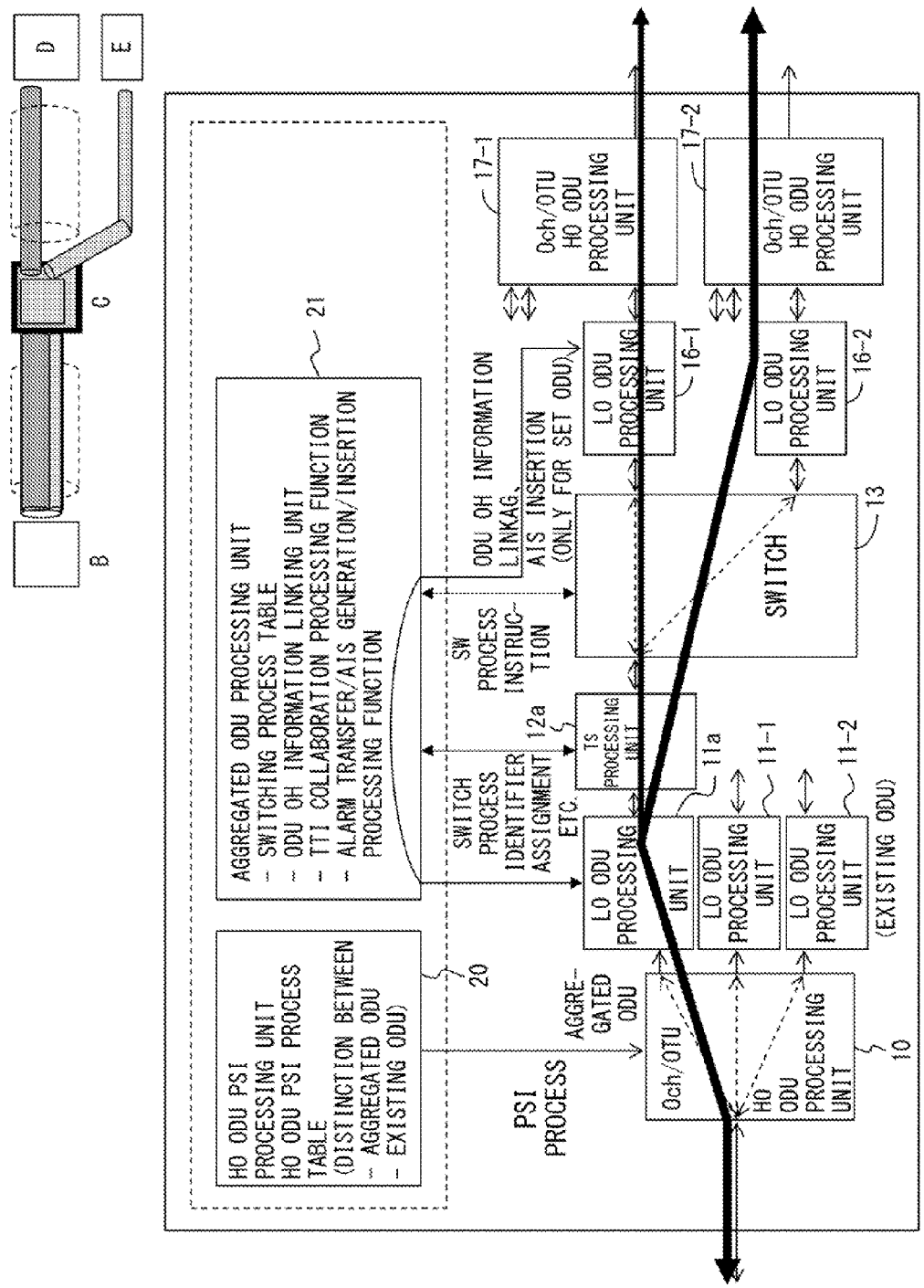
FIG. 5 illustrates operations of an optical transmission apparatus according to this embodiment.

FIG. 5 illustrates operations of an optical transmission apparatus according to this embodiment.

In FIG. 5, a configuration of a switching process function of an existing (normal) LO ODU is omitted.

A node C illustrated in an upper portion of FIG. 5 is assumed as an example of an apparatus illustrated in a lower portion of FIG. 5. An ODU including an aggregated ODU is input as HO ODU input from the left side. In a process for disassembling the HO ODU into LO ODUs (Och/OTU HO ODU processing unit 10), a distinction is made between an aggregated ODU and a normal (existing) ODU. To make the distinction, an HO ODU PSI (Payload Structure Identifier) processing unit 20 recognizes an identifier PSI indicating that each TS (Tributary Slot) is included in an aggregated ODU. The HO ODU PSI processing unit 20 has a table for this recognition as an HO ODU PSI process table. For an aggregated ODU, switching of a principal signal needed to generate an ODU for the next link, an associated alarm transfer, and an identifier inheritance process are executed after the TS process is executed.

Namely, an aggregated ODU processing unit 21 is provided to process an aggregated ODU. The aggregated ODU processing unit 21 includes a switching process table, an ODU overhead (OH) information linkage unit, a TTI (Trail Trace identifier) collaboration process function, and an alarm transfer/AIS generation/insertion process function. The aggregated ODU processing unit 21 instructs an LO ODU processing unit 11a to extract information of an ODU OH and to detect an alarm. LO ODU processing units 16-1, 16-2 mount the obtained information of the ODU OH in an OH of a corresponding aggregated ODU. Moreover, the aggregated ODU processing unit 21 detect, based on the obtained alarm information, whether or not an error has occurred. If detecting that the error has occurred, the aggregated ODU processing unit 21 generates AIS. Then, the LO ODU processing units 16-1, 16-2 insert the generated AIS in a corresponding aggregated ODU.

Additionally, the aggregated ODU processing unit 21 causes a TS processing unit (SW internal processing unit) 12a to assign a switching process identifier to an internal frame by using the TTI collaboration process function. Moreover, the aggregated ODU processing unit 21 instructs the switch 13 to execute a switching process of an internal frame including data (that may not be TS itself but is data in a layer almost the same level as TS) equivalent to TS included in an aggregated ODU based on the switching process table.

FIG. 6 illustrates an example of a configuration of the HO ODU PSI process table.

The HO ODU PSI process table is configured, for example, with a table that makes an association between a TS number in an HO ODU and an ODU type. Based on this table, the Och/OTU HO ODU process illustrated in FIG. 5 is executed. By way of example, for an ODU 3, a PSI is extracted according to FIGS. 19 to 20A of ITU-T G.709, and ODTU (Optical channel Data Tributary Unit) information vs TS information within the PSI is extracted. At this time, a distinction can be simultaneously made between a TS included in an aggregated ODU and a TS included in an existing ODU with reference to the table that is illustrated in an upper portion of FIG. 6 and makes an association between a TS umber and an ODU type.

In the table (HO ODU PSI process table) that is illustrated in FIG. 6 and makes an association between a TS number and an ODU type, whether an ODU including a TS is either an aggregated ODU or an existing ODU is registered in association with the TS number. As an ODTU Type (LO ODU type), information indicating either ODUflex having a variable data length or an ODU having a fixed data length is registered. When an aggregated ODU is set, the number of TSs included in the aggregated ODU varies depending on the number of aggregated paths. Therefore, ODU flex (ODTU3.ts) having a variable data length is set. For an existing ODU, the number of included paths is fixed. Therefore, any of ODTU 13, 23 having a fixed data length and ODTU3.ts having a variable data length may be set.

PSI is information for identifying a configuration of a payload included in the overhead of an OTU frame. In this embodiment, 21 or 22 is used as a payload type indicated by PSI. PSI=21 or 22 is a payload type defined by ITU-T G.709. In PSI, an ODTU type and a Tributary port number are associated with each other and stored for each TS.

In the HO ODU PSI process table, an LO ODU indicated to be included in an aggregated ODU is input to an LO ODU processing unit for processing an aggregated ODU and processed. In contrast, an LO ODU indicated to be included in an existing ODU is input to an LO ODU processing unit for processing an existing ODU and processed.

Figure 7:
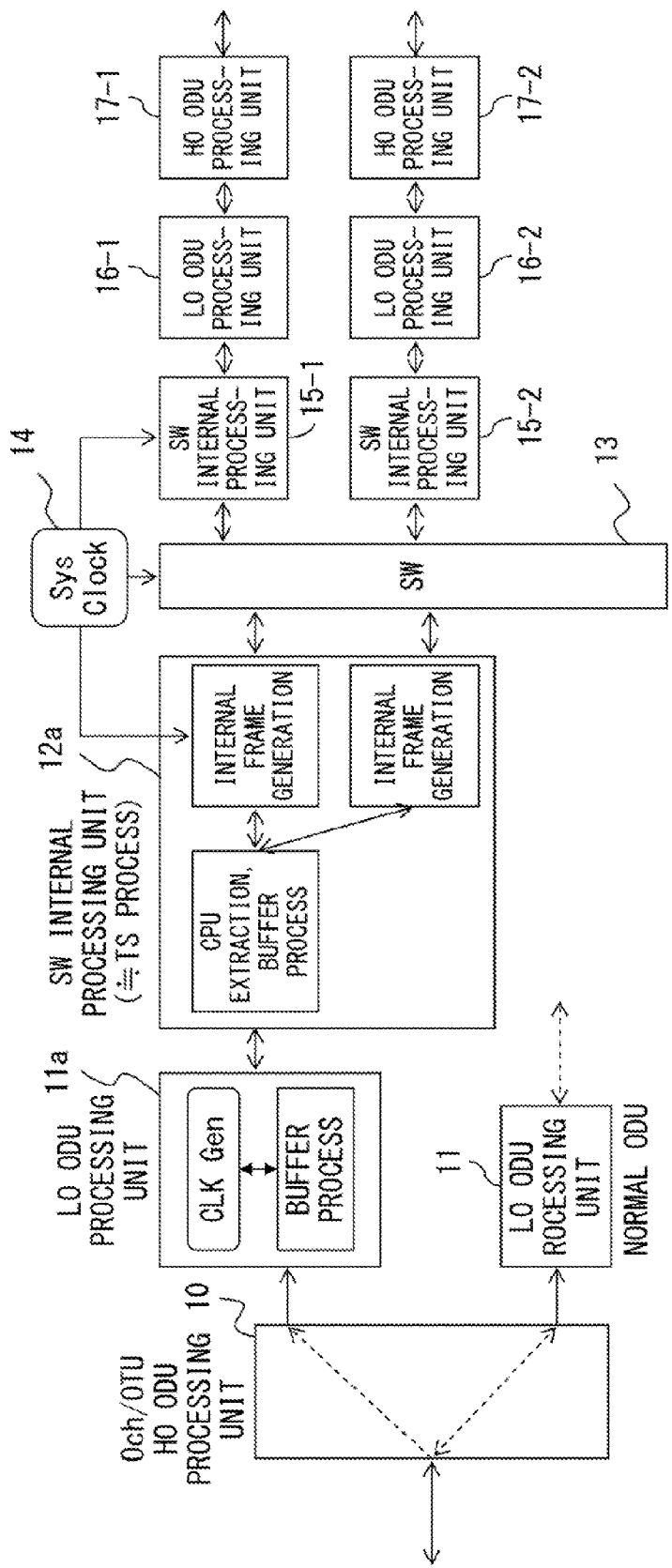
FIG. 7 is a block diagram illustrating a configuration of the optical transmission apparatus according to this embodiment.

FIG. 7 is a block diagram illustrating a configuration of the optical transmission apparatus according to this embodiment.

Figure 1A:
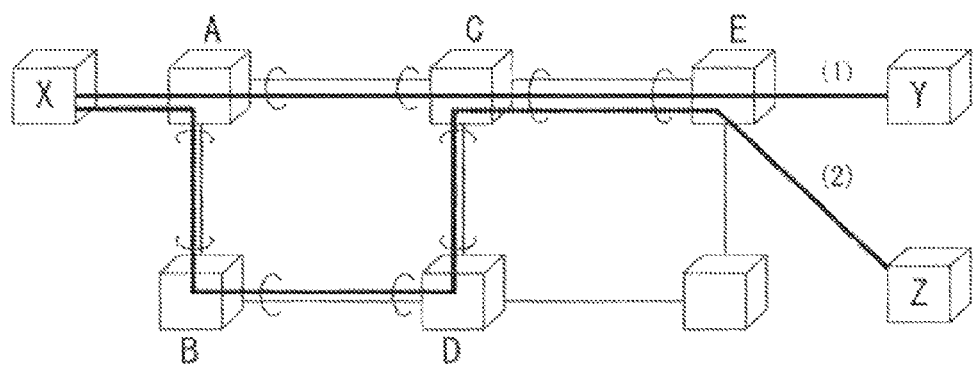
FIGS. 1A and 1B are explanatory views of a conventional technique.
Figure 1B:
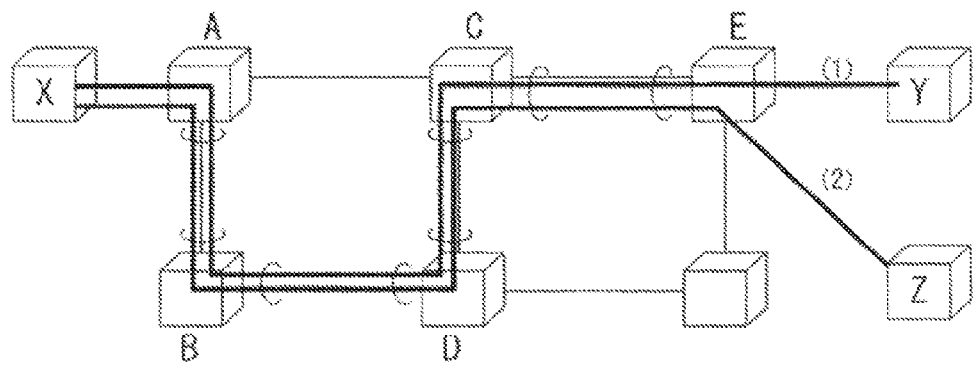
Figure 2:
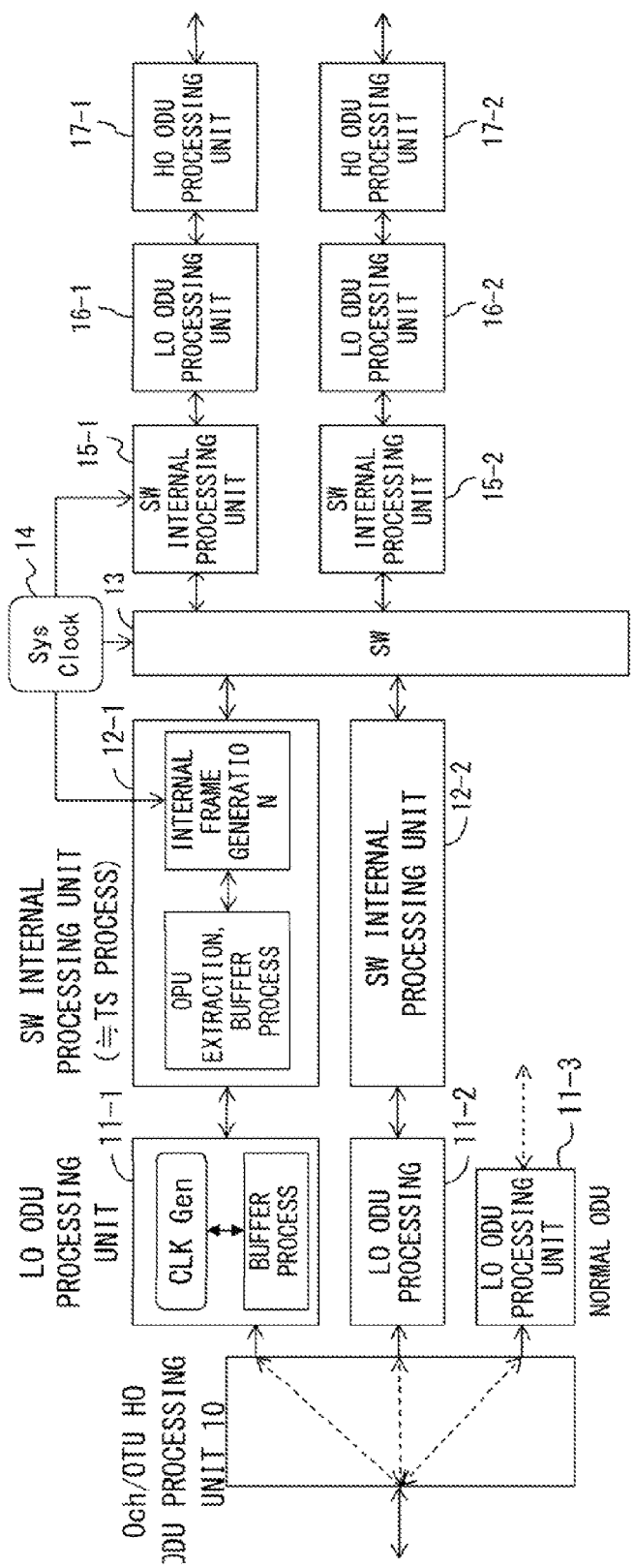
FIG. 2 is a block diagram illustrating a configuration of a conventional relay node.
Figure 3:
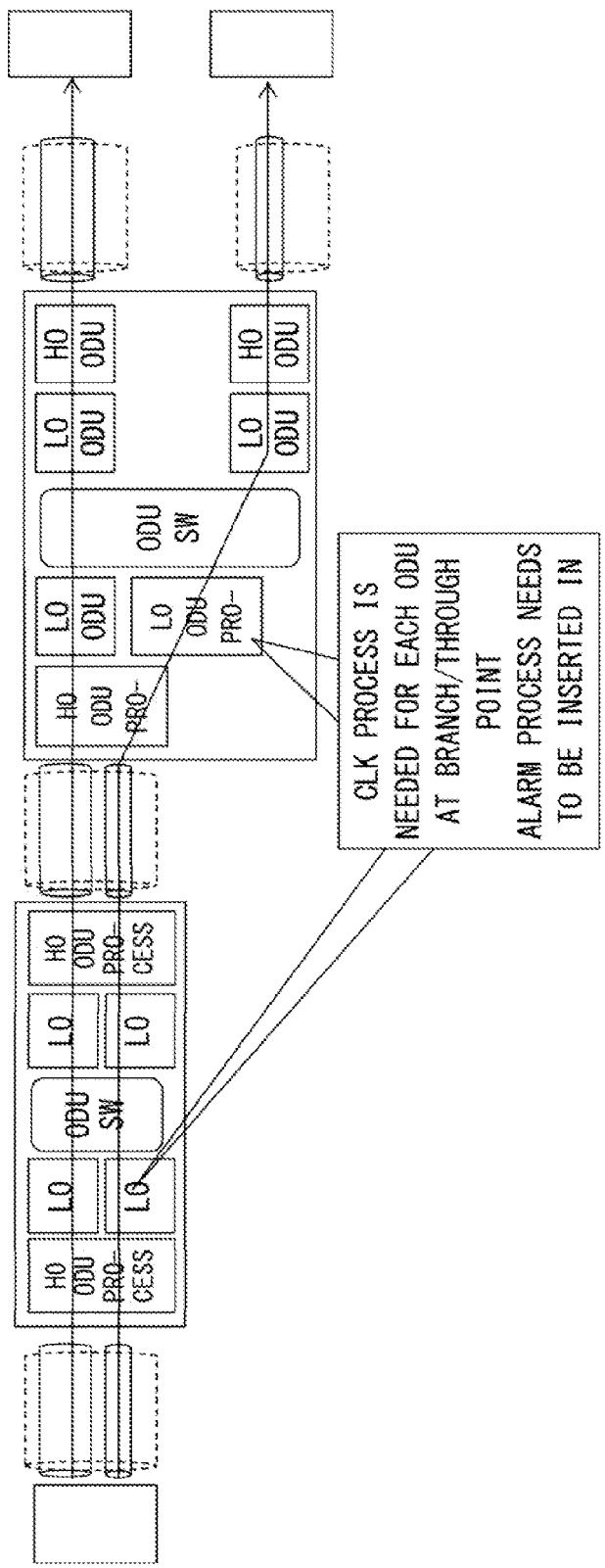
FIG. 3 is an explanatory view of a conventional problem.

In FIG. 7, like components of those illustrated in FIG. 2 are denoted with like reference numerals, and their descriptions are omitted.

By implementing the aggregated ODU process, needless processes executed by the LO ODU processing unit 11a, especially, a clock extraction process (clock generator) can be reduced. With the conventional method, the clock process is executed for each LO ODU input to each LO ODU processing unit when an HO ODU is disassembled into LO ODUs also as illustrated in FIG. 2. In this embodiment, ODUs that can be aggregated are aggregated and collectively processed, thereby eliminating the need for an individual clock process for each of LO ODUs included in an aggregated ODU.

According to ITU-T recommendation G.798, switching can be performed in units of LO ODUs. In an existing switching process, however, an internal frame for switching is generated. It is desirable that a unit of the internal frame is equivalent to a TS. Eventually, the LO ODU process is executed in units of TSs regardless of whether ODUs are either aggregated or individually switched. In this embodiment, a function to distribute an aggregated ODU in units of TSs is needed within the SW internal processing unit 12a. However, there is no significant difference in this portion in terms of a circuit configuration. Therefore, an effect of reducing circuitry can be consequently achieved by the number of the processes that are executed by the LO ODU processing unit 11a and become unnecessary. Moreover, since the number of used ports is reduced, also the number of ODU switching tables that make an association between an input port and an output port can be reduced.

Figure 8:
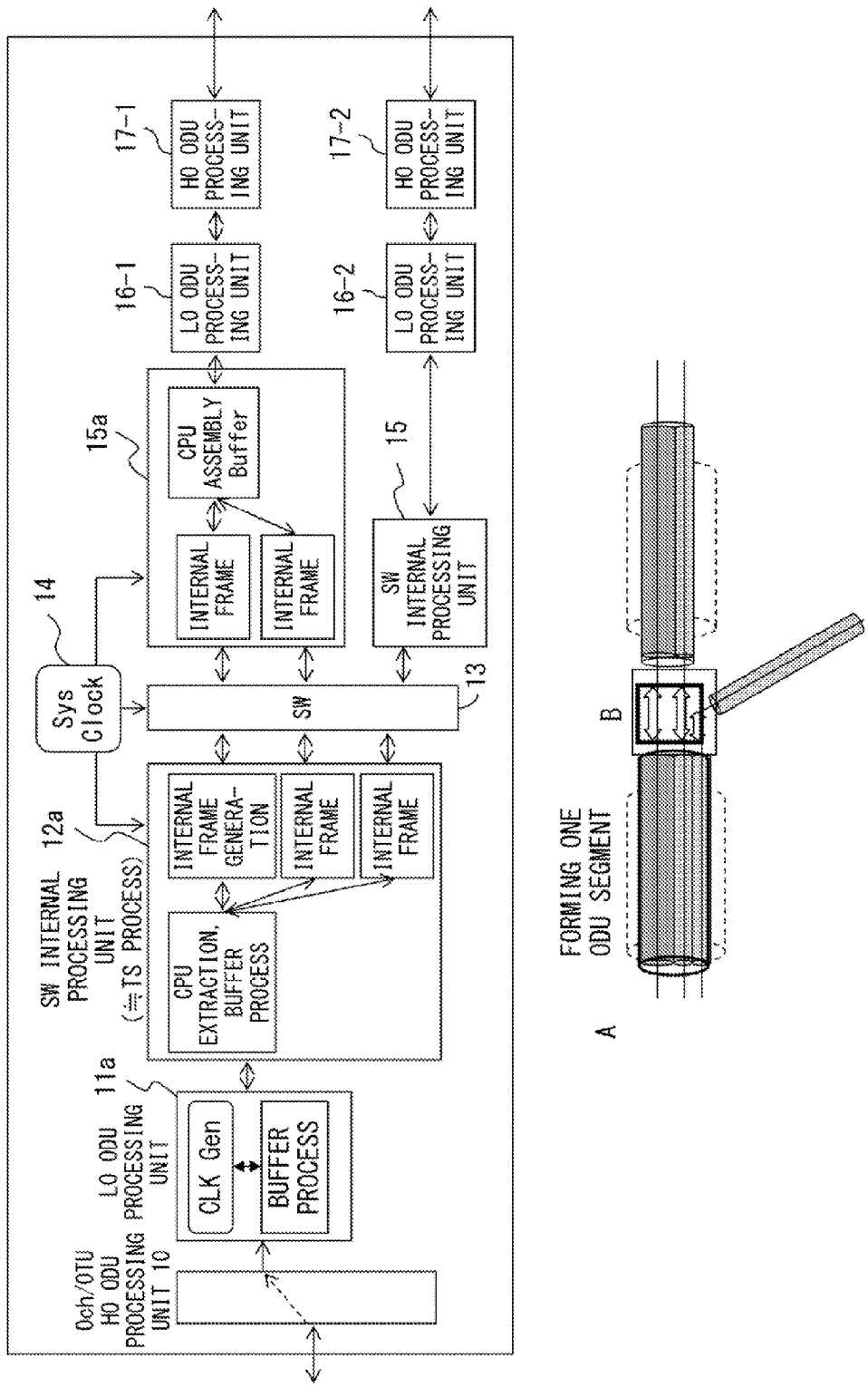
FIG. 8 illustrates operations of a node B in FIGS. 4A and 4B.

FIG. 8 illustrates operations of the node B illustrated in FIGS. 4A and 4B.

In FIG. 8, like components of those of FIG. 7 are denoted with like reference numerals, and their descriptions are omitted.

The node illustrated in FIG. 8 corresponds to a case where a node has an aggregated ODU on its both sides. Namely, the operations of the node B illustrated in a lower portion of FIG. 8 are illustrated.

Similarly to the case of FIG. 7, an HO ODU input from the left side is disassembled into LO ODUs in units of aggregated ODUs and input to the LO ODU processing unit 11a. The aggregated ODU includes a plurality of LO ODUs, for which a buffer process and clock extraction are performed in units of aggregated ODUs. For the aggregated ODU processed by the LO ODU processing unit 11a, a buffer process and OPU extraction are performed by the SW internal processing unit 12a. Then, an internal frame for a switching process is created in a unit equivalent to a TS, and the SW 13 executes the switching process for the internal frame. After the switching process is executed, internal frames equivalent to TSs included in the same aggregated ODU are input to the same SW internal processing unit 15a. Then, data equivalent to the TSs extracted from the internal frames are assembled into an OPU. Next, the HO ODU processing unit 17-1 assembles the OPU into one HO ODU and transmits the assembled HO ODU.

Figures 9A, 9B:
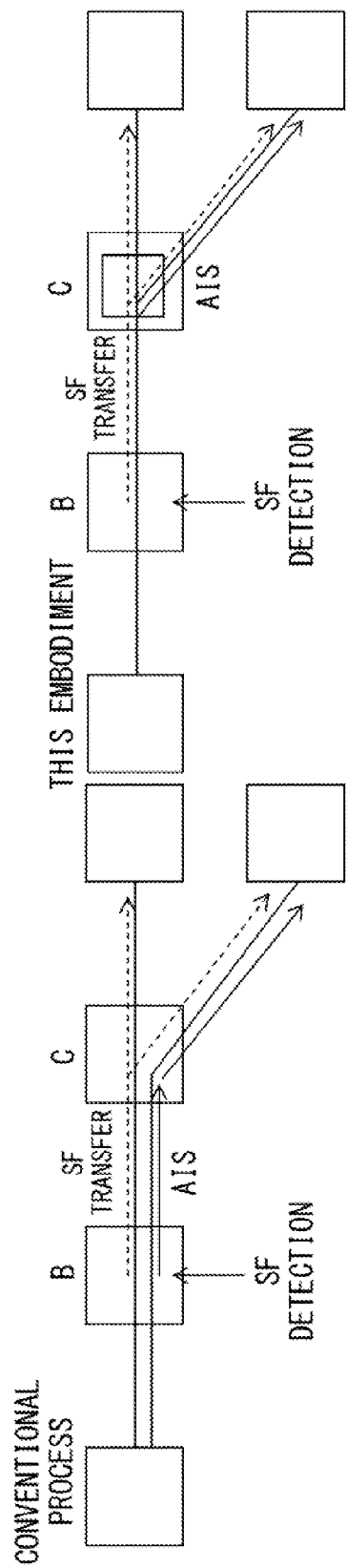
FIGS. 9A and 9B are explanatory views of reductions in an alarm transfer process.

FIGS. 9A and 9B are explanatory views of reducing the alarm transfer process.

The alarm transfer process can be reduced by processing ODU processes collectively with an aggregated ODU when an AIS (Alarm Indication Signal) process is executed in the LO ODU process. If an AIS is generated in an HO ODU, an SF (Signal Failure) is detected also at an LO ODU level. Therefore, the AIS may be handled at any of the HO ODU level and the LO ODU level. In contrast, if an AIS is not generated although an SF is detected at the HO ODU level and only the SF is notified to the LO ODU level, an AIS needs to be generated at the LO ODU level. In this case, the AIS may be generated with the aggregated ODU process and may be notified to a destination of ODUs included in an aggregated ODU. Accordingly, the alarm transfer process can be executed collectively for an aggregated ODU, whereby the number of LO ODU processing units can be reduced, and an effect of reducing hardware processes can be achieved.

FIG. 9A illustrates a conventional alarm process. AIS is generated upon detection of an SF at the LO ODU level in the node B, and once terminated by the node C. Then, an AIS including the same contents is newly generated and transferred. FIG. 9B illustrates an alarm process according to this embodiment. Upon detection of an SF of an aggregated ODU, an AIS is generated by the node B. The AIS is notified to the node C, which collectively processes an aggregated ODU and does not disassemble the aggregated ODU into LO ODUs. Therefore, the AIS is transferred to a destination of ODUs included in the aggregated ODU.

In the meantime, paths are individually set for the plurality of ODUs included in the aggregated ODU. This is the state of FIG. 4A. Therefore, procedures for changing the state of FIG. 4A to the state of FIG. 4B to which the aggregated ODU process is applied are needed.

Figure 10:
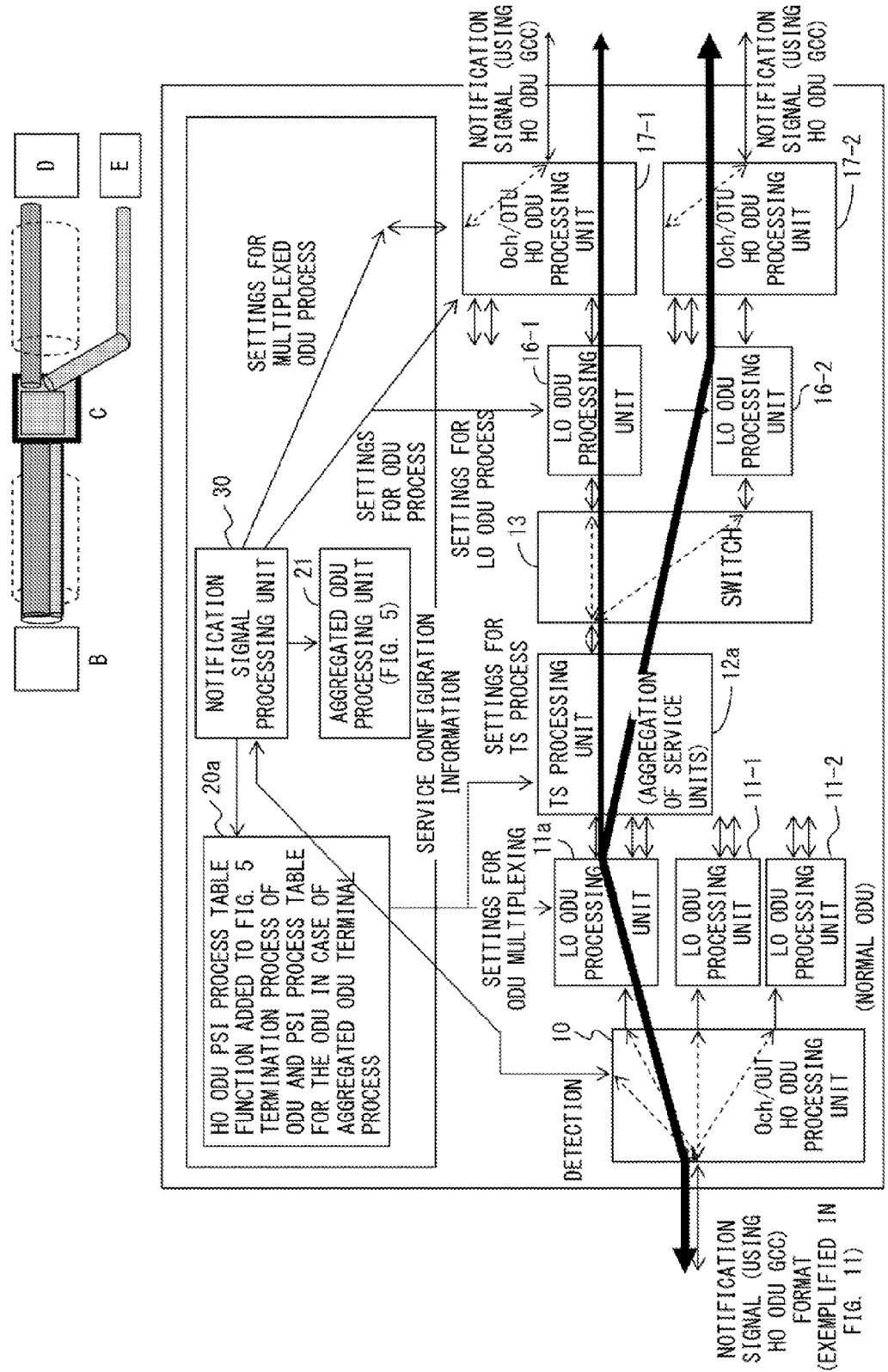
FIG. 10 is an explanatory view (No. 1) of operations for setting an aggregated ODU process.

FIGS. 10, 11A and 11B are explanatory views of operations for setting the aggregated ODU process.

In FIG. 10, like components of those of FIG. 5 are denoted with like reference numerals, and their descriptions are omitted.

FIG. 10 illustrates a setting method for changing an ODU configuration from the state of FIG. 4A to the state of FIG. 4B. This figure illustrates a method for setting/forming (controlling) an aggregated ODU from an originating side (the node A of FIGS. 4A and 4B), and an apparatus configuration for implementing this method. This method is executed in a state where paths for individual ODUs including an aggregated section have been already set.

This method can be implemented by setting, from the node A, a type of an ODU path, a topology and the like in an HO ODU GCC (High Order Optical channel Data Unit General Communication Channel) of a notification signal having a format exemplified in FIG. 11A and by transmitting the notification signal to each node. The HO ODU GCC of the notification signal stores information, obtained in advance, of a node that a path goes through, and its ODU information. These items of information are read by a notification signal processing unit 30 of each node, so that whether or not a path is aggregated Hop by Hop is set.

FIG. 10 illustrates a configuration and a process of the node C where a path branches (see the upper portion of FIG. 10). After processing the notification signal in the format illustrated in FIG. 11A with the notification signal processing unit 30, the node C makes settings (including HO ODU and LO ODU) needed to terminate the aggregated ODU for the side of the node B, sets the aggregated ODU processing unit illustrated in FIG. 5, and sets LO ODU information for the side of nodes D and E.

With this process, the HO ODU processing unit illustrated in FIG. 5 or 10 makes a distinction between a conventional ODU and an aggregated ODU.

The notification signal is received by the Och/OTU HO ODU processing unit 10, which notifies its contents to the notification signal processing unit 30. The notification signal processing unit 30 determines whether or not the local node is included in an ODU path based on information of the ODU path of the notification signal with the use of the HO ODU PSI process table 20a. Then, the notification signal processing unit 30 decides for which ODU the aggregated ODU process is to be executed by referencing the HO ODU PSI process table 20a, sets the aggregated ODU process in the LO ODU processing unit 11a, and sets the TS process in the TS processing unit (SW internal processing unit) 12a. Moreover, the notification signal processing unit 30 sets the LO ODU process in the LO ODU processing units 16-1, 16-2, and makes ODU multiplexing settings in the Och/OTU HO ODU processing units 17-1, 17-2. The notification signal itself is transmitted from the Och/OUT HO ODU processing units 17-1, 17-2 to the next node.

The format of the notification signal illustrated in FIG. 11A indicates that the GCC header within the header of an OTU frame is used to notify information of an aggregated ODU. In the GCC header, a network configuration predetermined by a network administrator is recorded as an ODU type or a connection relationship among nodes (topology). Information within the GCC header of FIG. 11A describes a network configuration of FIG. 11B. ODUk indicates an ODU path type, and a to c indicate the number of TSs included in a payload. In this case, two or more ODU paths are provided on a link between the nodes A through C. Therefore, an aggregated ODU path can be set.

Figure 11:
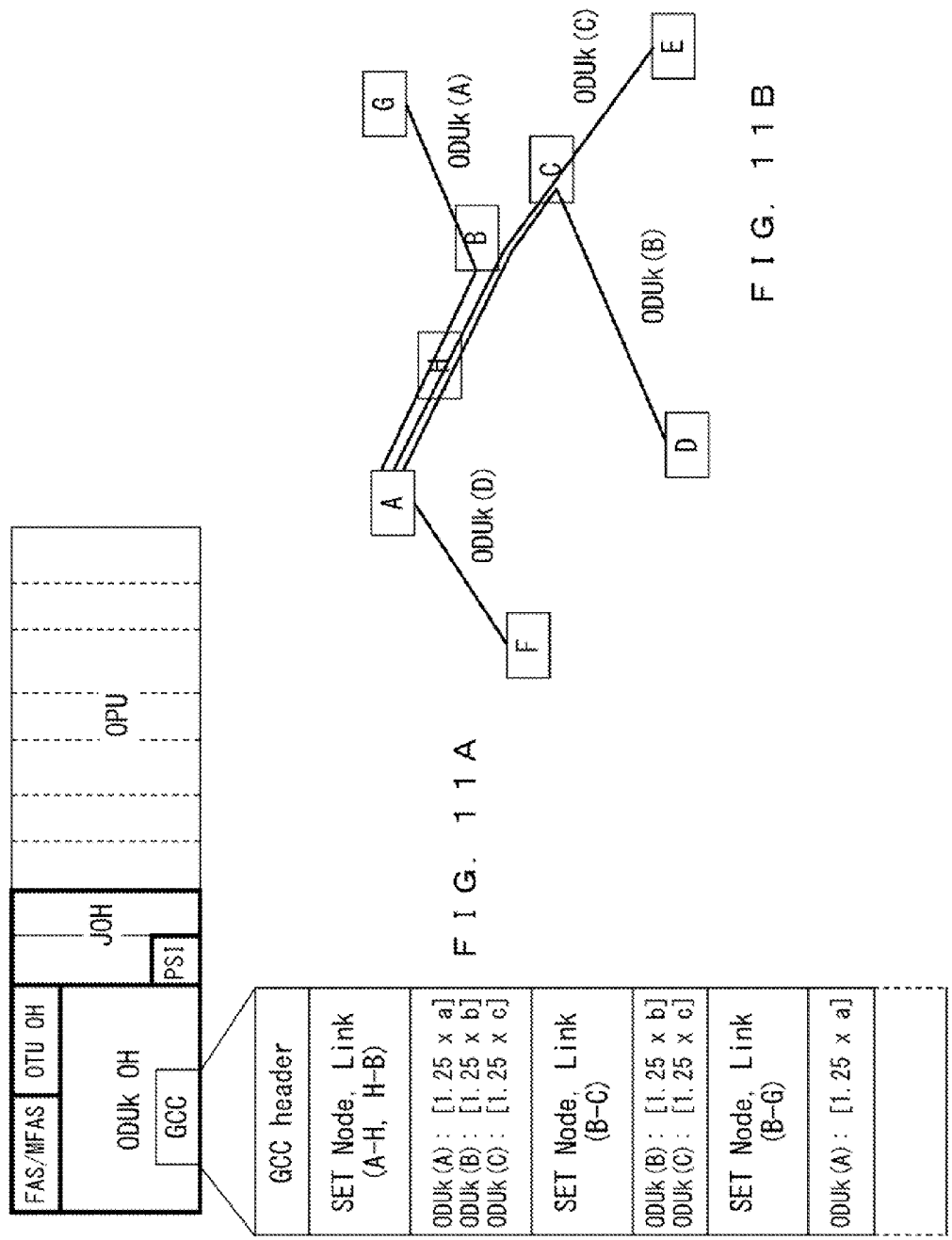
FIGS. 11A and 11B are explanatory views (No. 2) of the operations for setting the aggregated ODU process.

The method for setting the aggregated ODU process illustrated in FIGS. 10 and 11 is a method applied when a network topology is clarified in advance. However, also an algorithm for detecting/setting a network topology itself may be used.

FIGS. 12 to 17 are explanatory views of network topology detection and settings for the aggregated ODU process.

Figure 12:
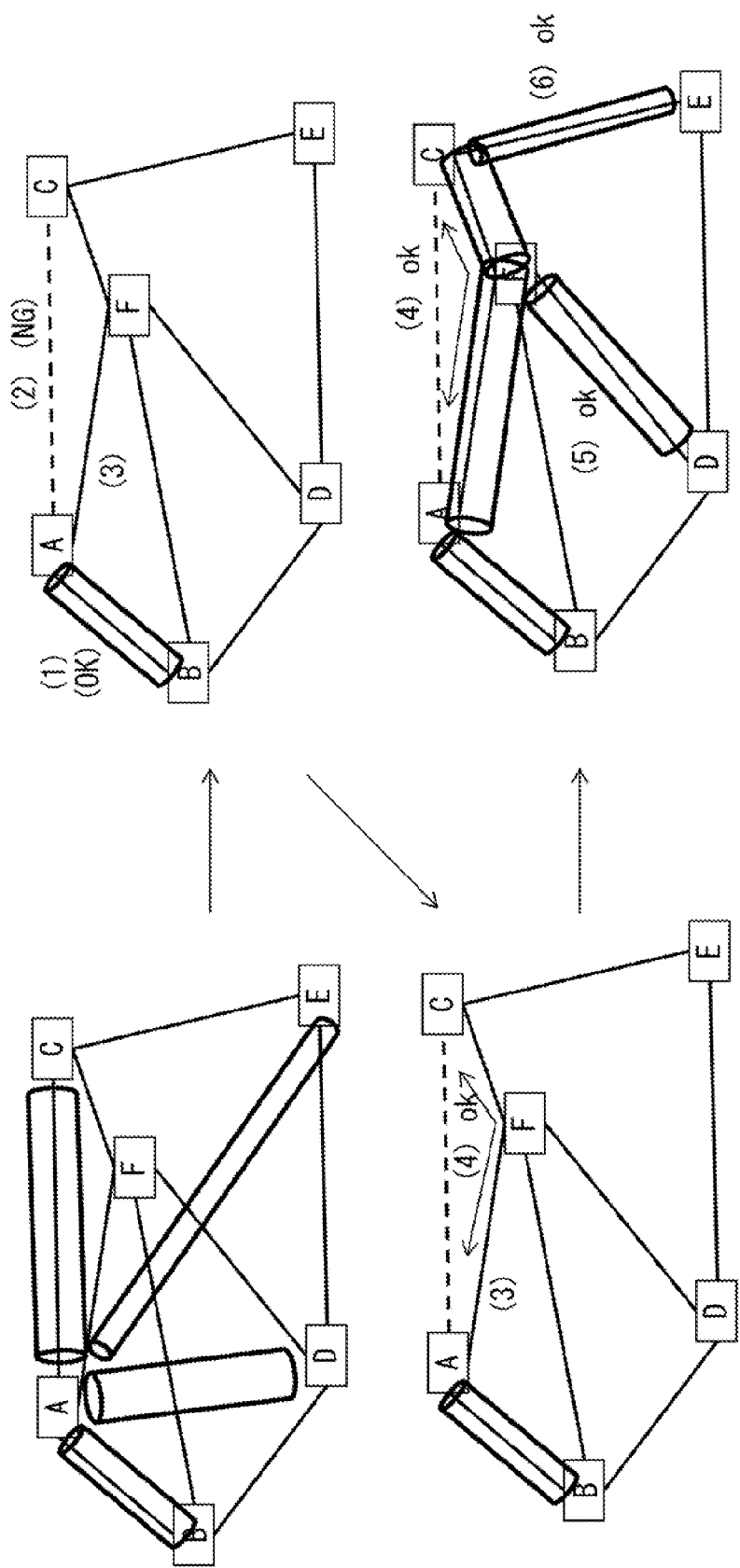
FIG. 12 is an explanatory view (No. 1) of network topology detection and settings for an aggregated ODU process.
Figure 13:
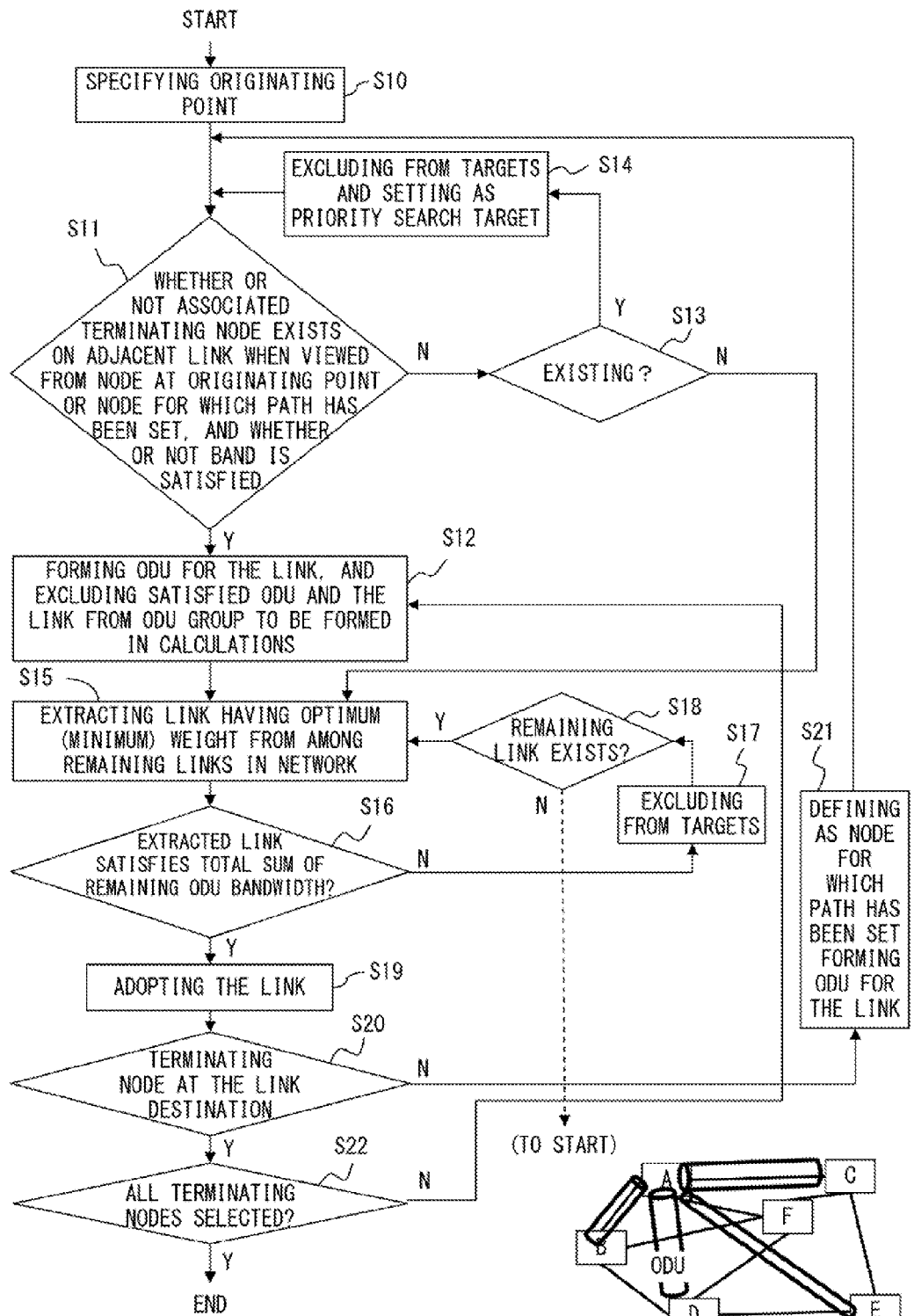
FIG. 13 is an explanatory view (No. 2) of the network topology detection and the settings for the aggregated ODU process.

FIGS. 12 and 13 illustrate an example of an ODU setting algorithm and its flowchart, respectively. These example and flowchart illustrated in FIGS. 12 and 13 assume that an ODU path is formed from an originating point A to B to C to D to E. In a topology, a path for a one-to-multi communication is formed, and aggregated sections as many as possible are set.

FIG. 12 illustrates an outline of the ODU setting algorithm. If an adjacent node (other than the node A) is a terminating node (other than the nodes A and F) when viewed from the originating node A and a predetermine bandwidth is satisfied when viewed from the terminating node, an ODU is formed in a section between the originating node and the terminating node, and at the same time, the ODU connected in this band is excluded from a list of one-to-multi-ODUs yet to be processed. If the terminating node does not exist, a route optimum for the remaining band is selected according to a weight assigned to a link, and the terminating node is again searched from nodes at link destinations. In this way, a tree is sequentially extended. As a result, ODU paths are always aggregated when viewed from the upstream (originating point), and a tree path is formed by defining only one port for an input port. This weight is decided based on an ODU band and an operation cost, power consumption or the like of a section. The weight does not need to be decided only based on a band.

A route is established between the nodes A and B by determining that the node B is an adjacent node and a terminating point when viewed from the node A and by verifying that the bandwidth is satisfied (1). Next, it is verified that the node C is an adjacent node and a terminating point. Here, assume that a bandwidth is insufficient. Accordingly, it is decided that a route is not used between the nodes A and C simultaneously with the route between the nodes A and B (2). Then, it is determined whether or not the total sum of the ODU bandwidth can accommodate a communication between the nodes A and F excluding the bandwidth between the A and B. If the total sum can accommodate the communication, a route between the nodes A and F is temporarily decided (3). Next, it is determined that the nodes C and D are adjacent nodes and terminating points when viewed from the nodes A and F (between A and F). A band condition of the node C is searched with priority. If the bandwidth satisfies the total sum of the ODU bandwidth, the route between the nodes F and C is decided, and also the route between the nodes F and D is decided at the same time. As a result, the total sum of the ODU bandwidth between the nodes F and C provides the route excluding the section between the nodes A and D (4), (5). Next, it is determined that the node E is an adjacent node and a terminating point when viewed from the node C, and a route between the nodes C and E is formed (6).

FIG. 13 is a flowchart illustrating a process, executed by each node apparatus, for executing the algorithm illustrated in FIG. 12.

In step S10, a node at an originating point is initially specified. In step S11, it is determined whether or not a terminating node exists on an adjacent link when viewed from the node at the originating point or a node for which an ODU path has been set, and whether or not a bandwidth is satisfied. If the determination of step S11 results in "NO", it is determined in step S13 whether or not there is such an adjacent link. If the determination of step S13 results in "YES", this link is excluded from process targets in step S14, and set as a priority search target (by adding a predetermined value to a weight (initiated to 0 at the start of the process)). Then, the flow goes back to step S11. If the determination of step S13 results in "NO", the flow goes to step S15.

If the determination of step S11 results in "YES", an ODU path is formed for the link, and a band of the formed ODU path is excluded from the band of the link in step S12. In step S15, a link having an optimum (minimum) weight is extracted from among remaining links within the network. Next, in step S16, it is determined whether or not the extracted link satisfies the total sum of the remaining ODU bandwidth.

If the determination of step S16 results in "NO", the link is excluded from the process targets in step S17. In step S18, it is determined whether or not a remaining link exists. If the determination of step S18 results in "YES", the flow goes to step S15. If the determination of step S18 results in "NO", the flow goes back to step S10.

If the determination of step S16 results in "YES", it is decided to adopt the link in step S19. Then, in step S20, it is determined whether or not a node at the link destination is a terminating node. If the determination of step S20 results in "NO", the node is set as a node for which a path has been set, and an ODU path is formed for the link in step S21. Then, the flow goes back to step S11.

If the determination of step S20 results in "NO", the flow goes to step S22, in which it is determined whether or not all of terminating nodes have been selected. If the determination of step S22 results in "NO", the flow goes back to step S12. If the determination of step S22 results in "YES", the process is terminated.

If a plurality of corresponding links exist as a result of the determination of step S11, the processes in and after step S11 are repeated. An ODU path is formed in an order starting from a terminating node that is not a relay node, to a node that has an optimum (minimum) weight and is used as a relay node, and to a remaining node processed as a terminating node.

Figure 14:
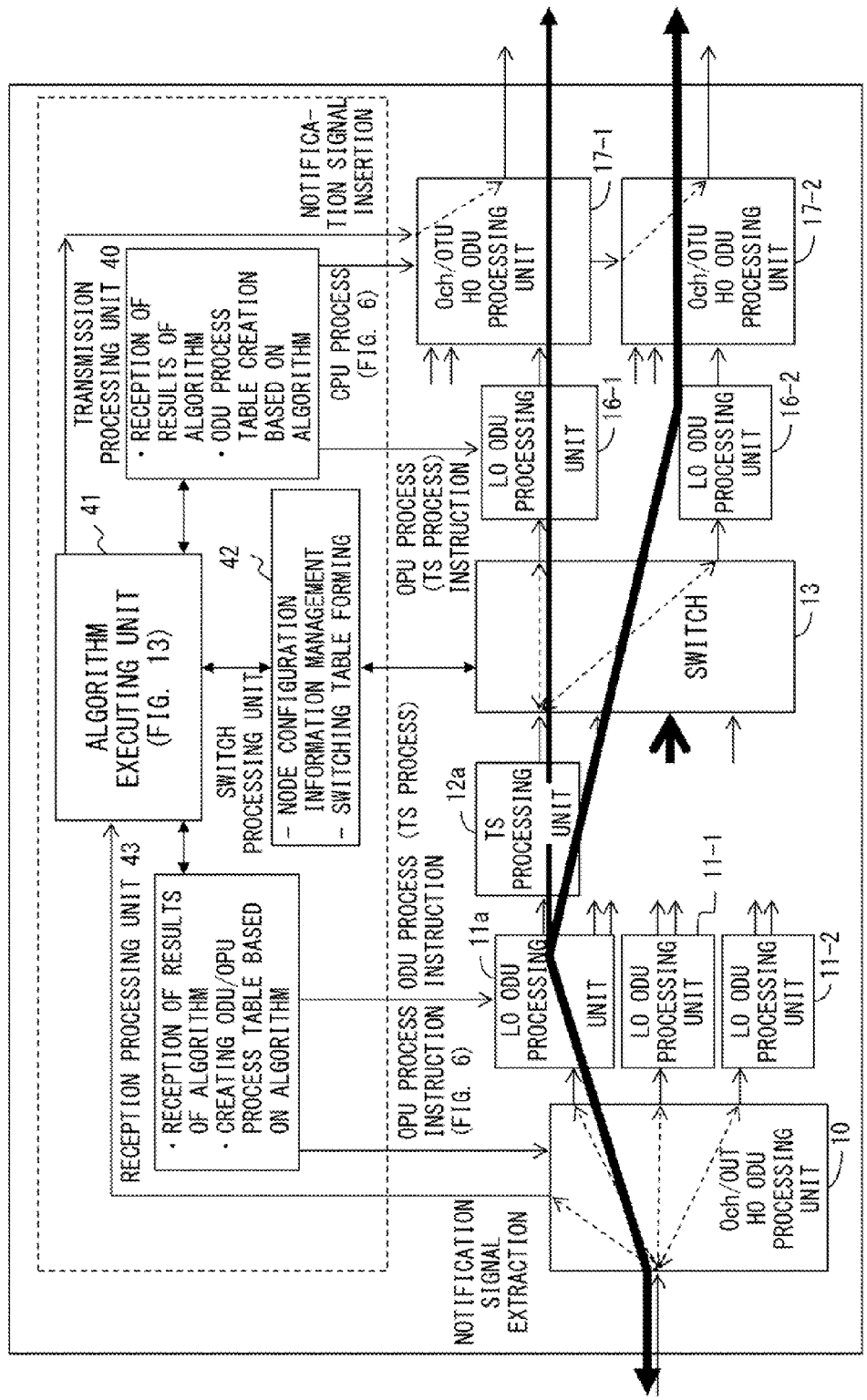
FIG. 14 is an explanatory view (No. 3) of the network topology detection and the settings for the aggregated ODU process.

FIG. 14 illustrates a configuration of an apparatus for executing the topology decision process illustrated in FIGS. 12 and 13.

In FIG. 14, like components of those of FIG. 5 are denoted with like reference numerals, and their descriptions are omitted.

In FIG. 14, the apparatus includes an algorithm executing unit 41 configured, as a main part, to execute the algorithm illustrated in FIGS. 12 and 13, interfaces with OUT/ODU processing units, namely, a transmission processing unit 40 and a reception processing unit 43 implemented in units of HO ODUs, and a switch processing unit 42 configured to control a switch based on a result of the algorithm within the algorithm executing unit 41. The algorithm executing unit 41 executes the process flow of FIG. 13.

Information exchange by the algorithm executing unit 41 is implemented by transfer means (such as the GCC or the like of the notification signal illustrated in FIGS. 11A and 11B or the like) for exchanging a protocol between links. This information is extracted and collected by the reception processing unit 43.

Adjacent node connection information needed to execute the algorithm is obtained from the switch processing unit 42 based on this information, and the information is propagated with the GCC or the like of the notification signal via the transmission processing unit 40.

The algorithm executing unit 41 performs switching with the internal frame process based on the switch internal process (TS processing unit 12a), namely, an ODU and a TS. However, the switching varies depending on a setting condition of a plurality of ODUs to be targeted in each node.

Figure 15:
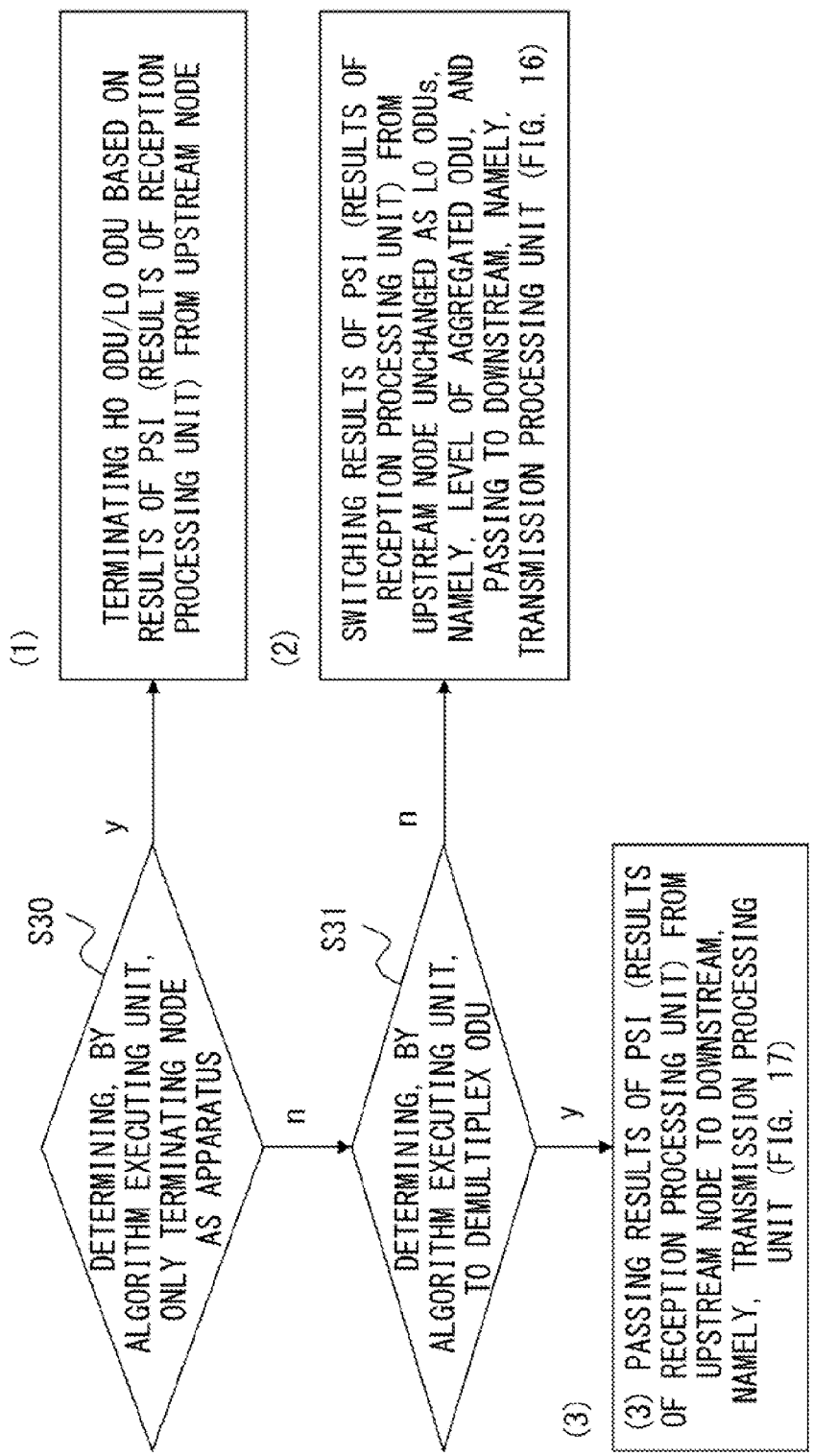
FIG. 15 is an explanatory view (No. 4) of the network topology detection and the settings for the aggregated ODU process.

As indicated by step S30 of FIG. 15, if determining only a terminating node as an apparatus at a transfer destination, the algorithm executing unit 41 executes a process (1). Otherwise, the algorithm executing unit 41 determines whether or not to disassemble an ODU as indicated by step S31. If the determination of step S31 results in "NO", the algorithm executing unit 41 executes a process (2). If the determination of step S31 results in "YES", the algorithm executing unit 41 executes a process (3).

In the process (1), only a termination process is to be executed. Therefore, only the reception process is set in the configuration of FIG. 14. Namely, HO ODU PSI information (the table in the lower portion of FIG. 6) that is notified from the upstream is received, and the ODU process is executed.

Figure 16:
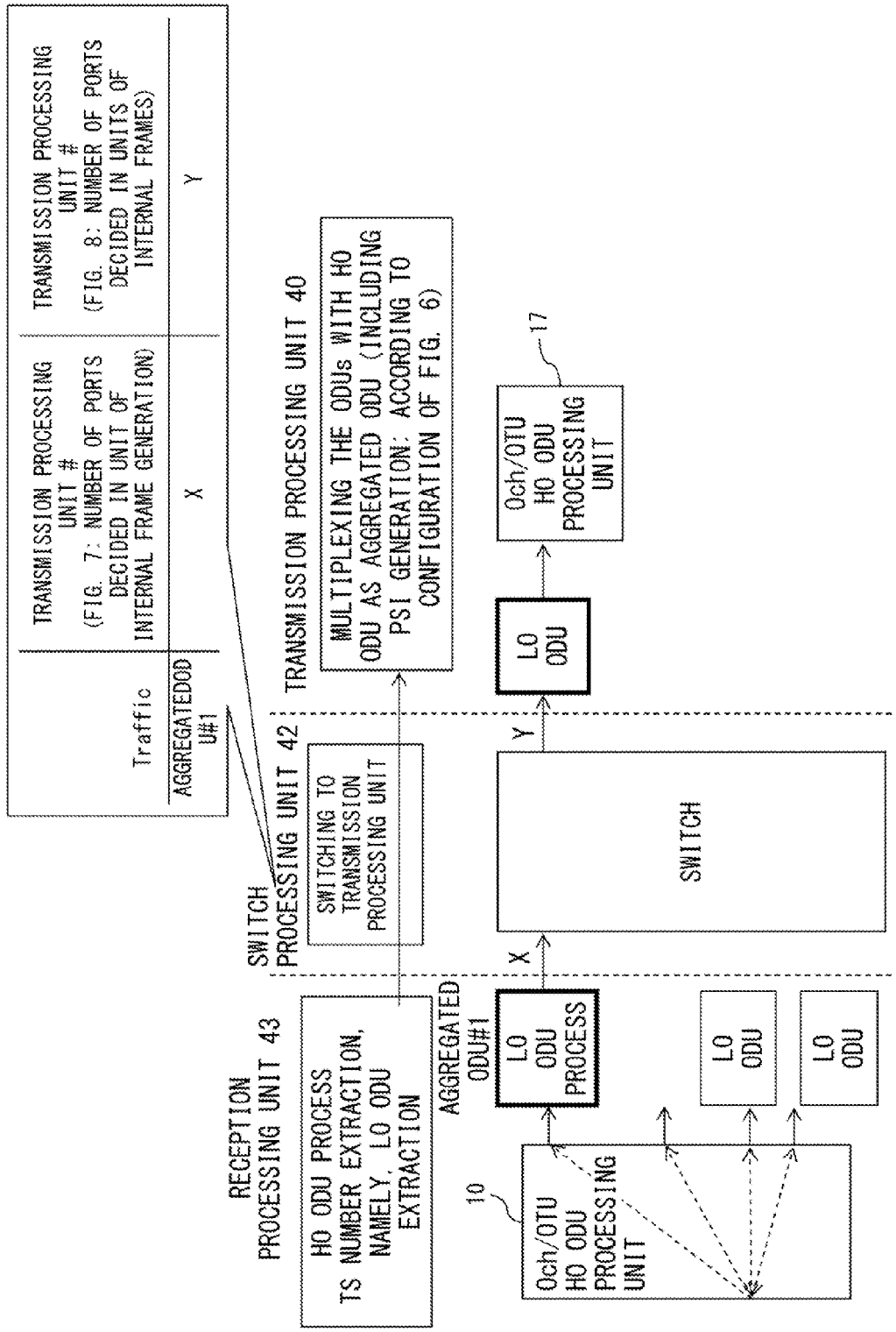
FIG. 16 is an explanatory view (No. 5) of the network topology detection and the settings for the aggregated ODU process.

In the process (2), an aggregated ODU included in the HO ODU information notified from the upstream is switched and passed to the transmission processing unit 40 on the downstream side unchanged as illustrated in FIG. 16. A table of this switching is formed by the switch processing unit 42 (switching is performed according to the internal frame process illustrated in FIG. 7, and also the table is formed with ports in a unit of this process). The Och/OTU HO ODU processing unit 17 on the downstream side generates a PSI needed to multiplex a band of an aggregated ODU, namely, a TS arrangement with the HO ODU, multiplexes the PSI and the band, and passes this information to the next node.

Figure 17:
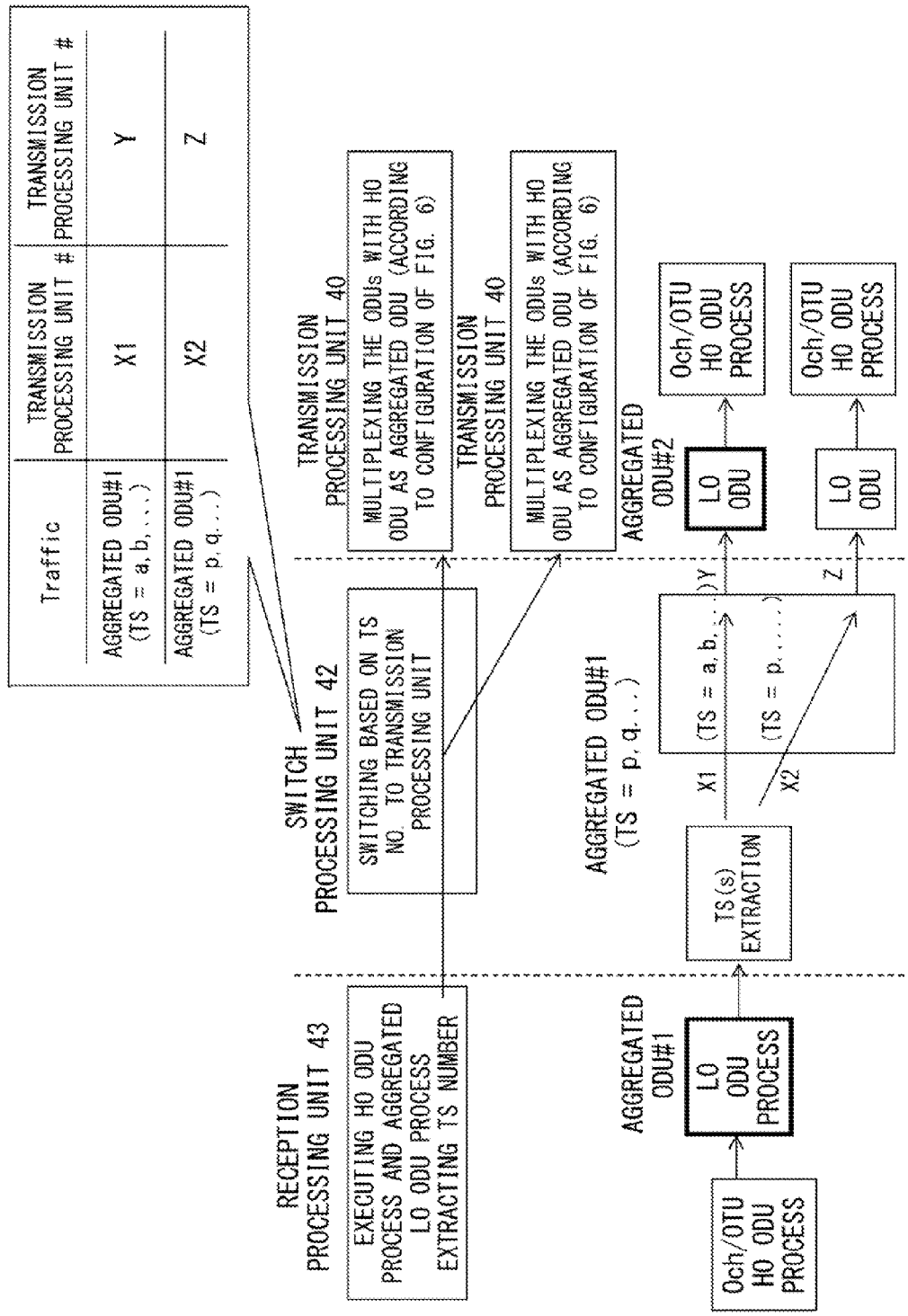
FIG. 17 is an explanatory view (No. 6) of the network topology detection and the settings for the aggregated ODU process.

The process (3) is different in points that a unit of switching is divided into TSs of an aggregated ODU, and that information of results of the algorithm of the plurality of transmission processing units 40 are passed as illustrated in FIG. 17. However, the same operations as those of FIG. 16 other than these different operations are performed.

The above described embodiment refers to the distributed control of the processes in this embodiment for each node. However, the control functions of the nodes can be also aggregated via a management server and can be intensively controlled.

According to the above described embodiment, a plurality of ODU paths from one point to a plurality of points are set, and the ODU paths are aggregated for a partial section (that is, a common link) and provided. Then, the functions to form one ODU segment for the aggregated section and to maintain an alarm transfer function for each ODU are provided, whereby hardware processes such as a clock process in the aggregated section are reduced.

Accordingly, the number of used ports and the number of ODU switch tables can be reduced by aggregating and providing ODU paths.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An optical transmission apparatus in a network for making a one-to-multi communication by establishing paths from one point to multi points, the optical transmission apparatus comprising:
   a reception side high-order layer data unit processing circuit configured to demultiplex a first aggregated data unit of a plurality of data units of a low-order layer from other data units of a low-order layer, the plurality of data units of the low-order layer being transmitted by using a plurality of paths sharing a section within the network and aggregated into the first aggregated data unit as one aggregation, when data is transmitted in the section shared by the plurality of paths in a process for extracting data units of a low-order layer from a data unit of a high-order layer of an input optical signal;
   a reception side low-order layer data unit processing circuit configured to perform clock extraction in a unit of the first aggregated data unit, and to execute an alarm process in the unit of the first aggregated data unit;
   a switching circuit configured to perform switching by disassembling an output of the reception side low-order layer data unit processing circuit into internal frames for switching, and to generate data units of a low-order layer from the internal frames for switching after the switching is performed;
   a transmission side low-order layer data unit processing circuit configured to aggregate the plurality of data units of the low-order layer transmitted by using the plurality of paths sharing the section among the data units of the low-order layer formed after the switching is performed into a second aggregated data unit of a low-order layer as one aggregation, and to insert alarm information, obtained by the reception side low-order layer data unit processing circuit, in the second aggregated data unit; and
   a transmission side high-order layer data unit processing circuit configured to assemble the second aggregated data unit from the transmission side low-order layer data unit processing circuit into a data unit of a high-order layer, and to transmit the assembled data unit.

2. The optical transmission apparatus according to claim 1, wherein the reception side low-order layer data unit processing circuit extracts overhead information from the first aggregated data unit, and the transmission side low-order layer data unit processing circuit mounts the extracted overhead information in the second aggregated data unit.

3. The optical transmission apparatus according to claim 1, wherein an upstream side of an optical transmission apparatus connected to the network transmits a notification signal for notifying information of a path to be formed to the optical transmission apparatus connected to the network, and the optical transmission apparatus sets a plurality of paths used by a plurality of data units of a low-order layer as one aggregation based on the information stored in the notification signal.

4. The optical transmission apparatus according to claim 3, wherein the path to be formed is automatically formed according to an entire bandwidth possessed by a line, a bandwidth of a link in the network, and a relationship between end points by executing an algorithm.

5. The optical transmission apparatus according to claim 4, further comprising:
   a transmission processing circuit configured to decide an arrangement within a data unit of a higher-order layer than data units in a unit of switching based on the information of the path to be formed, and to notify an adjacent link of the decided arrangement;
   a reception processing circuit configured to receive the arrangement of the data units in the unit of switching from the adjacent link; and
   a switch processing circuit configured to instruct how to execute a switch process based on the arrangement of the data units in the unit of switching.

6. A controlling method for an optical transmission apparatus in a network for making a one-to-multi communication by establishing paths from one point to multi points, the optical transmission apparatus conducting the method comprising:
   demultiplexing a first aggregated data unit of a plurality of data units of a low-order layer from other data units of a low-order layer, the plurality of data units of the low-order layer being transmitted by using a plurality of paths sharing a section within the network and aggregated into the first aggregated data unit as one aggregation, when data is transmitted in the section shared by the plurality of paths in a process for extracting data units of a low-order layer from a data unit of a high-order layer of an input optical signal,
   performing clock extraction in a unit of the first aggregated data unit,
   executing an alarm process in the unit of the first aggregated data unit,
   performing switching by disassembling the data units of the low-order layer into internal frames for switching,
   generating data units of a low-order layer from the internal frames for switching after the switching is performed,
   aggregating the plurality of data units of the low-order layer transmitted by using the plurality of paths sharing the section among the data units of the low-order layer formed after the switching is performed into a second aggregated data unit of a low-order layer as one aggregation, inserting alarm information, obtained with the alarm process, in the second aggregated data unit, and assembling the second aggregated data unit into a data unit of a high-order layer, and transmits the assembled data unit.

* * * * *